No. 60,951.

J. SMITH.
CURCULIO TRAP.

PATENTED JAN. 1, 1867.

Witnesses:
J. H. Layman
J. F. Magee

Inventor:
Jeremiah Smith.
By Knight Bros.
Attys.

United States Patent Office.

JEREMIAH SMITH, OF NEW MARKET, OHIO.

Letters Patent No. 60,951, dated January 1, 1867

IMPROVEMENT IN CURCULIO TRAP.

*The Schedule referred to in these Letters Patent and making part of the same.*

---

TO ALL WHOM IT MAY CONCERN:

Be it known that I, JEREMIAH SMITH, of New Market, Highland county, Ohio, have invented a new and useful Curculio Trap; and I do hereby declare the following to be a full, clear, and exact description thereof, reference being had to the accompanying drawings, making part of this specification.

My invention relates to a peculiarly-constructed joint, connecting the two parts of an expanding annular trough or cup, for enclosing the stem or trunk of a plum or other tree subject to the ravages of the curculio.

Figure 1:
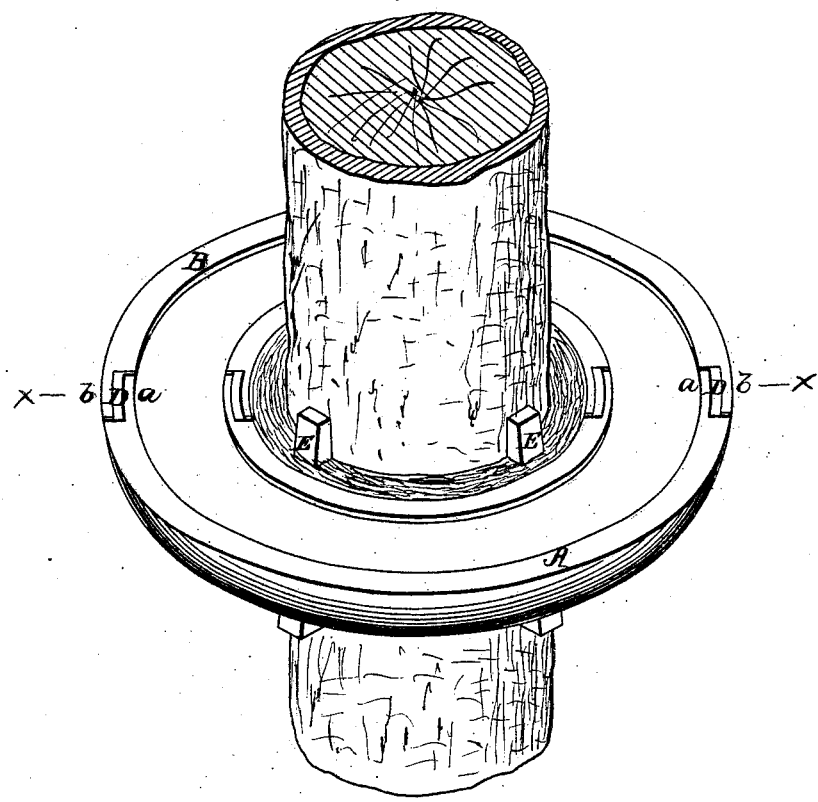
Figure 1 is a perspective view of a curculio trap embodying my invention.
Figure 2:
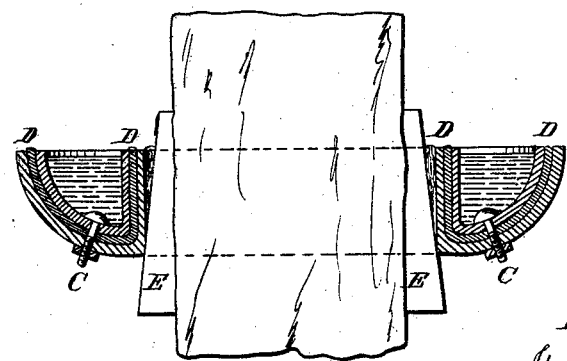
Figure 2 is an axial section of the same at the line $x\ x$.

I provide two semi-annular troughs, A B, of wood, and having rebates, $a\ b$, which overlap each other, as shown in fig. 1, and when in place around the stem of the tree are secured together by screws, C, which traverse the rebated portions $a\ b$, as shown in fig. 2. The rebates are formed with sufficient play or room for the insertion of an India-rubber or other gasket, D, at each joint, which, in conjunction with the screws C, serves to effectually close the joints, whether the members of the cup be pressed closely together or not. A cup of suitable size having been selected, its two halves are placed opposite to each other so as to embrace the trunk of the tree, and gaskets having been inserted, the rebates are made to overlap, and the two halves are pressed moderately together and secured by means of the screws C. Wooden wedges, E, about three in number, being then inserted between the cup and the tree, serve to hold the former in position without occupying much of the circumference or interfering with the growth of the latter. The interstice between the cup and the trunk being then packed with oakum or other suitable material, the cup is filled with coal tar, or other viscid substance distasteful to the curculio, and the trap is complete. The trap being applied on the approach of that season when the curculio is found seeking a nidus for her eggs, this insect, following her instinctive custom, climbs the stem of the tree, and meeting with the trap, becomes either entangled in the tar, or drops on to the ground, to be again similarly baffled should she renew the attempt. The ovipositing season over, the trap may be removed until the following season, thus leaving the tree stem entirely accessible to all atmospheric influences and unobstructed as to growth. It will be seen that my provision of rebates, gaskets, and screws affords a cheap and effective way of constructing traps of this sort.

I claim herein as new, and of my invention—

The impervious elastic joint D $a\ b$, connecting the two parts of the trough A B, so as to permit its expansion, as set forth.

In testimony of which invention I hereunto set my hand.

JEREMIAH SMITH.

Witnesses:
GEO. H. KNIGHT,
JAMES H. LAYMAN.